United States Patent [19]

Parise et al.

[11] 4,083,705
[45] Apr. 11, 1978

[54] DUMP BUCKET FOR A WET/DRY VACUUM SYSTEM

[75] Inventors: Carl Parise, Reno, Nev.; Karl R. Uhlig, Huntington Beach; William W. Lockard, Long Beach, both of Calif.

[73] Assignee: Parise & Sons, Inc., Reno, Nev.

[21] Appl. No.: 744,675

[22] Filed: Nov. 24, 1976

[51] Int. Cl.² .............................................. B01D 47/00
[52] U.S. Cl. ................................ 55/257 NP; 15/353; 55/467
[58] Field of Search ..................... 15/320, 321, 353; 55/255, 256, 462, 465, 257 MP, 467

[56] References Cited

U.S. PATENT DOCUMENTS

| | | | |
|---|---|---|---|
| 963,139 | 7/1910 | Griffiths | 15/353 X |
| 996,991 | 7/1911 | Little | 55/256 |
| 1,363,859 | 12/1920 | Fetters et al. | 15/353 X |
| 1,363,860 | 12/1920 | Fetters et al. | 15/353 X |
| 2,212,429 | 8/1940 | Yutzler | 55/462 X |
| 2,673,619 | 3/1954 | Martin | 15/353 X |
| 3,896,521 | 7/1975 | Parise | 15/321 |
| 3,980,458 | 9/1976 | Berthoud | 55/255 X |

*Primary Examiner*—Christopher K. Moore
*Attorney, Agent, or Firm*—Sughrue, Rothwell, Mion, Zinn and Macpeak

[57] ABSTRACT

A dump bucket for a wet or dry vacuum system is disclosed. The dump bucket comprises (a) a container having a first aperture in its bottom and a second aperture at or near its top, (b) a hollow riser tube extending upwardly from the first aperture, (c) a hollow inner tube extending downwardly from the second aperture to a point near the bottom of the container and having at least one aperture at its bottom end, (d) a baffle cup surrounding the bottom end of the hollow inner tube, and (e) a hollow outer tube surrounding at least the upper end of the baffle cup, being open to the contents of the container beneath the top of the baffle cup, extending upwardly to a point near the top of the container, and having an opening at the top. During use of the dump bucket, the incoming stream of air, dirt, and/or water is filtered through water in the baffle cup and the annular space between the inner and outer hollow tubes above the baffle cup.

5 Claims, 2 Drawing Figures

DUMP BUCKET FOR A WET/DRY VACUUM SYSTEM

FIELD OF THE INVENTION

This invention pertains to vacuum systems such as are used for cleaning rugs, floors, drapes, furniture, etc. It is particularly, but not exclusively, adapted for use with a hot water extraction system of the type conventionally known as a steam cleaner.

SUMMARY OF THE INVENTION

The invention comprises an improved dump bucket of the type comprising (a) a container having a first aperture in its bottom and a second aperture at or near its top, (b) a hollow riser tube extending upwardly from the first aperture, and (c) a hollow tube extending downwardly from the second aperture to a point near the bottom of the container and having at least one aperture at its bottom end. The improvement comprises a baffle cup surrounding the bottom end of the hollow tube and a second hollow tube which surrounds at least the upper end of the baffle cup, which is open to the contents of the container beneath the top of the baffle cup, which extends upwardly to a point near the top of the container, and which is open at the top. During use of the dump bucket, the incoming stream of air, dirt, and/or water is filtered through water in the baffle cup and the annular space between the inner and outer hollow tubes above the baffle cup.

DETAILED DESCRIPTION OF THE PREFERRED EMBODIMENT

Figure 1:
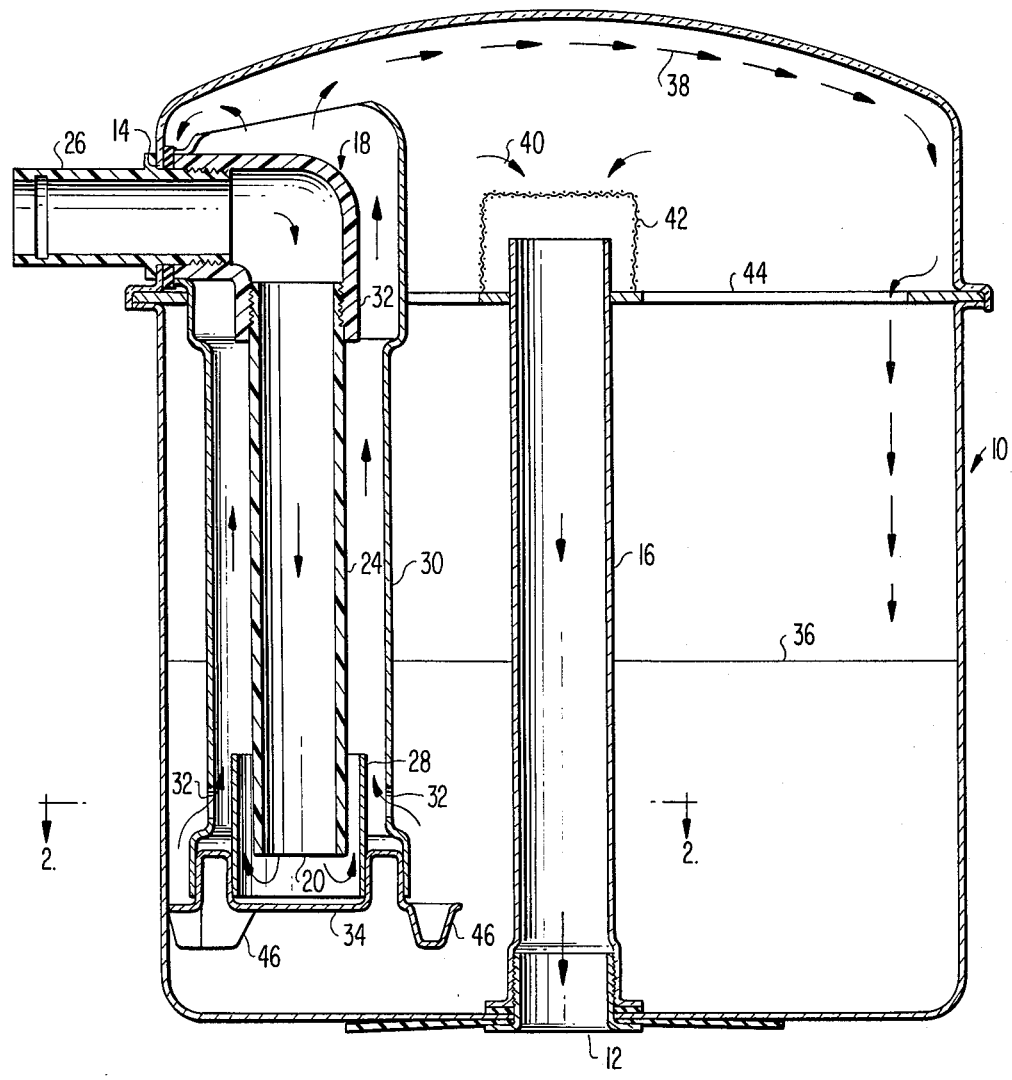
FIG. 1 is a sectional view of the presently preferred embodiment of this invention.
Figure 2:
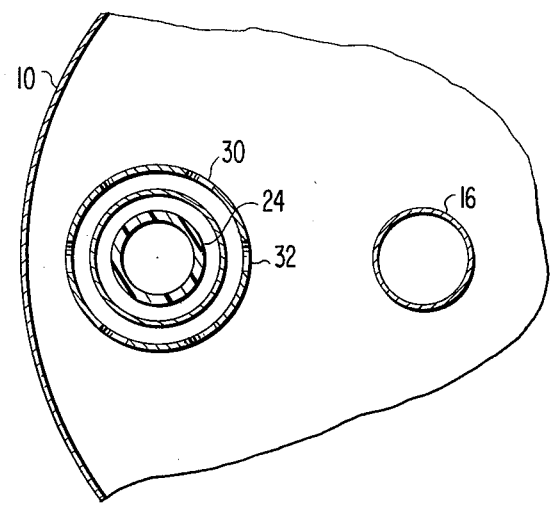
FIG. 2 is a view along the line 2—2 in FIG. 1.

Dump buckets of the general type involved herein are well known in the art and are shown, for example, in commonly assigned U.S. Pat. No. 3,911,524, issued Oct. 14, 1975. Such dump buckets comprise a container 10 having an aperture 12 in the bottom thereof and an aperture 14 at or near the top, a hollow riser tube 16 extending upwardly from the aperture 12, and a hollow tube 18 extending downwardly from the aperture 14 to a point near the bottom of the container 10 and having at least one aperture 20 at the bottom end thereof. During use of the dump bucket, a source of vacuum (not shown) is connected to the aperture 12 and a pickup hose (not shown) is connected to the aperture 14.

In the presently preferred embodiment, the hollow tube 18 comprises an elbow 22 which makes a right-angle bend towards the bottom of the container 10 and a straight piece 24 which is screwed into the elbow 22 and which is open at the bottom, but the hollow tube 18 obviously could be made integrally, it need not be shaped in the manner illustrated, and it could have a plurality of apertures at the bottom instead of the one aperture illustrated. Similarly, in the presently preferred embodiment the elbow 22 is screwed into a straight piece 26 which extends through the aperture 14, but the hollow tube 18 could obviously be held in place by many other expedients.

The subject improvement to dump buckets of the generally known type comprises a baffle cup 28 and a hollow tube 30. The baffle cup 28 surrounds the bottom end of the hollow tube 18 with its bottom oriented downwardly. It extends upwardly along the hollow tube 18 for a short distance, and it defines an annular space between the outside of the hollow tube 18 and the inside of the baffle cup 28. The hollow tube 30 surrounds at least the upper end of the baffle cup 28 and the hollow tube 18, it defines an annular space between the outside of the baffle cup 28 and the inside of the hollow tube 30, and it extends upwardly to a point near the top of the container 10. The hollow tube 30 is open to the contents of the container 10 beneath the top of the baffle cup 28, and it is open at the top. In the preferred embodiment shown in the drawings, the hollow tybe 30 is open at the bottom via a plurality of holes 32 therethrough beneath the top of the baffle cup 28, but the holes could be placed in the snap-on bottom plate 34, or the hollow tube 30 could simply have an open bottom end beneath the level of the top of the baffle cup 28.

By virtue of the foregoing improvement, the illustrated dump bucket can be used for either wet or dry vacuuming. When used with a hot water extraction unit of the type conventionally referred to as "steam cleaners", it allows the unit to be used either as a dry vacuum cleaner or as a "steam" cleaner without adjustment or modification.

The dump bucket works as follows. During use for either wet or dry vacuuming, the pressure in the container 10 is reduced by removing air through the aperture 12 with the previously mentioned source of vacuum connected to that aperture. Meanwhile, the pressure at the aperture 14 remains at atmospheric pressure less the friction drop through the previously mentioned pickup hose and any cleaning attachment attached thereto. In the case of use of the dump bucket for dry vacuuming, water is first placed in the container 10 to a level such as the indicated level 34 well above the holes 32. Incoming air and dirt is then pulled down the inner tube 24, is redirected upwards by the baffle cup 28, passes through, is filtered by, and picks up, mixes with, and becomes saturated by water drawn into the annular space between the outside of the tube 24 and the inside of the tube 30 by a Venturi effect, and splashes against the top of the container 10. At that point, the water and dirt separate from the air, the former following the path of the arrows 38 and the latter following the path of arrows 40 through a filtering screen 42 and into the riser pipe 16. In the case of use of the dump bucket for wet vacuuming, no water need be placed in the dump bucket initially (since the incoming dirt is already saturated with water), and the dump bucket can be used until the water has reached the level 44 where the two parts of the container 10 are joined during use of the dump bucket.

As shown, the bottom of the baffle cup 28 is preferably spaced from the bottom of the hollow tube 24, but it would be possible to place the bottom of the baffle cup 28 flush against the bottom of the hollow tube 24 and to provide vents for the incoming fluid stream in the side of the hollow tube 24. Similarly, while the baffle cup 28 is preferably held in place by the snap-on bottom plate 34, which is integral with the baffle cup 28 and held in place against the inside of the hollow tube 30 by spring force, it would be equally possible to mount the baffle cup 28 on the hollow tube 24 by means of struts or the like. However, the deflector cup 28 is preferably removable from the hollow tube 24 to allow for cleaning which may be necessary if large particles are carried into the dump bucket. In the preferred embodiment, this is accomplished by manually squeezing the tabs 46 together, pushing the snap-on hollow plate 34 away from the inside of the hollow tube 30, and then dropping the bottom plate 34 and the baffle cup 28 away from the hollow tubes 24 and 30.

The hollow tubes 24 and 30 and the baffle cup 28 are all preferably circular in cross-section and concentric to one another. However, it is believed that other cross-sections and non-concentric configurations could be used in place of the illustrated arrangement.

The cup 28 being of a diameter larger than the diameter of the inner tube 24, but smaller than the diameter of the outer tube 30, creates a narrow annular passage between the cup and the inner tube 24 where the flow velocity is at a maximum for the fluid whether it be a gas or liquid returning to dump bucket or container 10. Further, the upward flow of this fluid tends to create an aspirating effect for the liquid within the dump bucket which enters into the outer tube 30 by way of apertures 32. The water aspirates from the bucket to the interior of the outer tube 30 because the static pressure within the annular space between outer tube 30 and inner tube 24 is reduced by the amount of the velocity pressure due to the velocity of the fluid stream which moves upwardly for discharge through the open upper end of the outer tube 30. The removal of the cup 28 would produce the same result, but not to the degree possible by the inclusion of the cup which creates the high velocity flow between the annular wall of cup 28 and the outside of tube 24. In this case, with the cup removed, it is necessary that the bottom plate 34 be spaced axially from the bottom and open end of tube 24.

Caveat

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

We claim:

1. In a dump bucket for a vacuum cleaner system, said dump bucket comprising:
    - a cylindrical container having a bottom wall and a top wall and containing liquid therein and having its axis extending vertically;
    - a hollow riser tube extending upwardly from the bottom of the container and open at the bottom to the container exterior and being open at the top but terminating short of the container top wall;
    - tube means for introducing a flow of return fluid comprising air and contaminants into said container mounted within said container and extending vertically therein, said tube means including wall means defining separate, adjacent, parallel vertical first downwardly directed and second upwardly directed flow paths respectively;
    - said tube means further including a hollow, fluid return tube projecting through a wall of the container near its top and being in fluid communication with said first flow path at the upper end thereof, said tube means being closed off at its bottom and said tube means further including means forming a venturi for fluidly communicating said flow paths at the bottom of said tube means and increasing the velocity of the return fluid flow;
    - at least one aperture in said tube means near its bottom end in such proximity to said venturi and opening to said second flow path that liquid filling said container to a level above said at least one aperture is aspirated by return fluid moving through said venturi and upwardly into said second flow path to entrain said contaminates, and
    - an opening in said tube means communicating the upper end of said second flow path to the container interior;
    - whereby, a mixture of the return fluid and liquid flowing within said second flow path is discharged through the opening within said tube means for impact against the container interior and to separate the liquid and contaminate components from the air when vacuum pressure is applied to the hollow riser tube at the bottom of the dump bucket container, to effect filtering of the return fluid stream.

2. The dump bucket as claimed in claim 1, wherein said tube means includes a first tube having a portion projecting through said container near the top of the same and a major portion extending vertically downward therefrom and a second tube which concentrically surrounds said first tube, said main portion of said first tube and said second tube defining said wall means, and wherein the lower end of said first tube is open and faces the closed bottom end of said second tube and is spaced axially therefrom.

3. The dump bucket as claimed in claim 2, wherein said at least one aperture comprises a plurality of circumferentially spaced holes within the side of the second tube at a level above the open lower end of said first tube and said opening comprises an opening within the upper end of said second tube at a position above said first tube which faces the top of said container.

4. The dump bucket as claimed in claim 3, further comprising an open ended cup of a diameter greater than said first tube and smaller than said second tube, said cup being positioned between the first and second tubes, facing the open end of the first tube with its bottom spaced axially therefrom and having an annular sidewall extending vertically above the lower end of the first tube and the inner surface of said annular sidewall and the outer surface of the lower end of the first tube comprising said venturi forming means.

5. The dump bucket as claimed in claim 2, further comprising an open ended cup of a diameter greater than said first tube and smaller than said second tube, said cup being positioned between the first and second tubes facing the open end of the first tube with its bottom spaced axially therefrom and having an annular sidewall extending vertically above the lower end of the first tube and the inner surface of the annular sidewall and the outer surface of the lower end of the first tube comprising said venturi forming means.

* * * * *

UNITED STATES PATENT OFFICE
CERTIFICATE OF CORRECTION

Patent No. 4,083,705  Dated April 11, 1978

Inventor(s) Carl Parise et al.

It is certified that error appears in the above-identified patent and that said Letters Patent are hereby corrected as shown below:

The term of this patent subsequent to March 14, 1995 has been disclaimed.

Signed and Sealed this

Fourth Day of July 1978

[SEAL]

Attest:

RUTH C. MASON
*Attesting Officer*

DONALD W. BANNER
*Commissioner of Patents and Trademarks*